(12) United States Patent
Tanaka et al.

(10) Patent No.: US 11,962,893 B2
(45) Date of Patent: Apr. 16, 2024

(54) IMAGE SYSTEM AND METHOD FOR CONTROLLING IMAGING SYSTEM

(71) Applicant: CANON KABUSHIKI KAISHA, Tokyo (JP)

(72) Inventors: Ryosuke Tanaka, Kanagawa (JP); Kazuya Ino, Kanagawa (JP); Minoru Sakaida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/580,775

(22) Filed: Jan. 21, 2022

(65) Prior Publication Data

US 2022/0239828 A1 Jul. 28, 2022

(30) Foreign Application Priority Data

Jan. 27, 2021 (JP) ................. 2021-010945

(51) Int. Cl.
*H04N 23/60* (2023.01)
*H04N 5/262* (2006.01)
*H04N 23/611* (2023.01)
*H04N 23/63* (2023.01)

(52) U.S. Cl.
CPC .......... *H04N 23/64* (2023.01); *H04N 5/2628* (2013.01); *H04N 23/611* (2023.01); *H04N 23/635* (2023.01)

(58) Field of Classification Search
CPC .............. G02B 27/0172; H04N 5/272; H04N 5/23296; H04N 45/23203; G06T 11/60; G06T 15/205; G06T 19/006
See application file for complete search history.

(56) References Cited

U.S. PATENT DOCUMENTS

| | | | |
|---|---|---|---|
| 2018/0007258 A1* | 1/2018 | Seko | H04N 5/23212 |
| 2018/0249062 A1* | 8/2018 | Jin | H04N 5/272 |
| 2018/0300954 A1* | 10/2018 | Fu | G06T 3/00 |
| 2018/0356636 A1* | 12/2018 | Kimura et al. | G02B 27/0172 |

FOREIGN PATENT DOCUMENTS

| | | |
|---|---|---|
| JP | 2013-005325 A | 1/2013 |
| JP | 2018-093303 A | 6/2018 |
| JP | 2020-204856 A | 12/2020 |

* cited by examiner

*Primary Examiner* — Xi Wang
(74) *Attorney, Agent, or Firm* — Venable LLP

(57) ABSTRACT

An imaging system includes a terminal device that includes an imaging sensor, and a head mounted display device that receives an image captured by the imaging sensor from the terminal device and displays the captured image. The imaging system includes at least one memory and at least one processor which function as: a detecting unit configured to detect the display device from the captured image; and a display control unit configured to control display of the captured image on the display device, based on a detection result of the display device using the detecting unit.

12 Claims, 16 Drawing Sheets

# IMAGE SYSTEM AND METHOD FOR CONTROLLING IMAGING SYSTEM

BACKGROUND OF THE INVENTION

Field of the Invention

The present invention relates to an imaging system, a display device, a terminal device, and a method for controlling the imaging system.

Description of the Related Art

In recent years, such techniques as AR and MR are used for head mounted displays (HMD), and for camera-equipped smartphones and tablet terminals. In an HMD that can be mounted on the head of a user in particular, a display is disposed directly in front of the eyes of the user, whereby the information volume provided to the user can be increased, and the user can experience a deeper sense of immersion.

The optical see-through type HMD is an HMD using a transparent display, and the intended use of which is different from a video see-through type HMD using an opaque display. Compared with the video see-through type HMD, an advantage of the optical see-through type HMD is that the user can view both a video display and an incident light from the outside world simultaneously. Furthermore, the eyes of the user wearing the optical see-through type HMD can be seen by others, hence in some cases, depending on the design of the HMD, the user wearing the HMD may be photographed as a subject.

According to an imaging apparatus according to Japanese Patent Application Publication No. 2018-093303, even in a case of a user taking a selfie with another person, the line-of-sight of each person can be directed to the camera at the timing of photographing by gradually reducing the size of the live view image, and moving themselves closer to the lens unit.

An electronic camera, according to Japanese Patent Application Publication No. 2013-005325, extracts a spectacle image region out of image data acquired by non-flash photography, and combines the extracted image data with the image data acquired by flash photography, whereby an image in which flash light is not captured by the spectacles is created.

In Japanese Patent Application Publication No. 2018-093303 and No. 2013-005325 however, photographing a subject wearing an HMD is not expected. Therefore in some cases of photographing a subject wearing an HMD, it may not be possible to photograph the subject appropriately.

SUMMARY OF THE INVENTION

The present invention provides an imaging system to photograph a subject wearing an HMD appropriately.

An imaging system of the present invention includes a terminal device that includes an imaging sensor, and a head mounted display device that receives an image captured by the imaging sensor from the terminal device and displays the captured image. The imaging system includes at least one memory and at least one processor which function as: a detecting unit configured to detect the display device from the captured image; and a display control unit configured to control display of the captured image on the display device, based on a detection result of the display device using the detecting unit.

Further features of the present invention will become apparent from the following description of exemplary embodiments with reference to the attached drawings.

DESCRIPTION OF THE EMBODIMENTS

Figure 1:
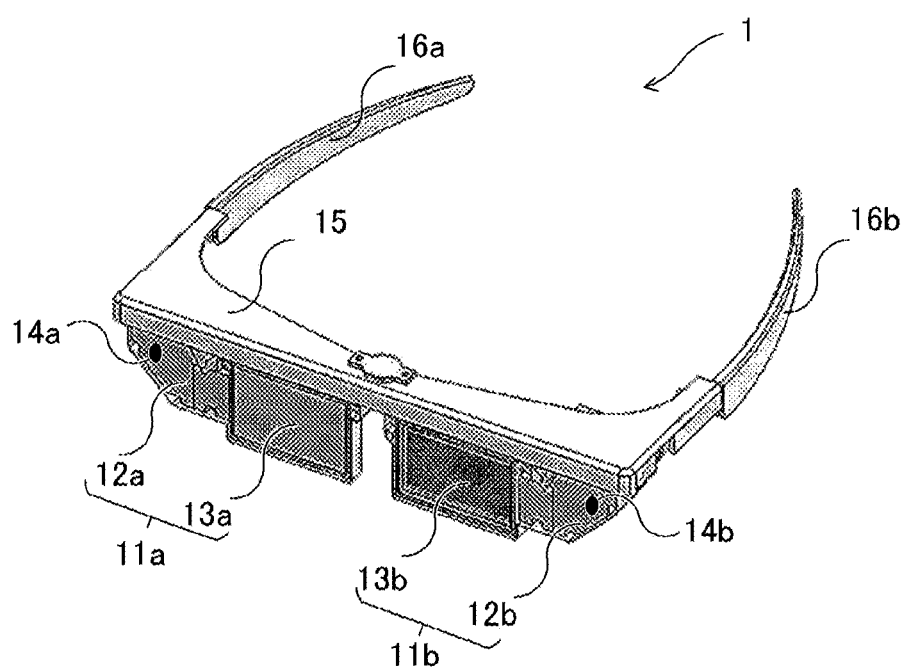
FIG. 1 is an external view of an HMD.
Figure 2A:
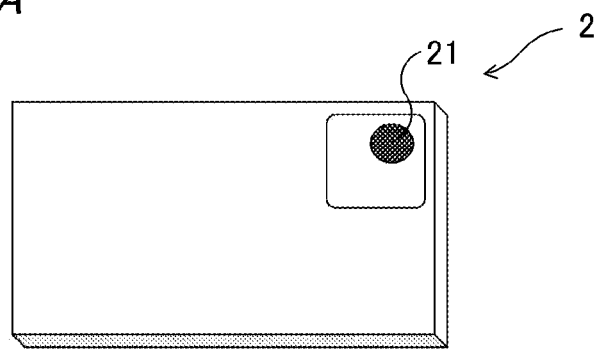
FIGS. 2A and 2B are external views of an information terminal.
Figure 2B:
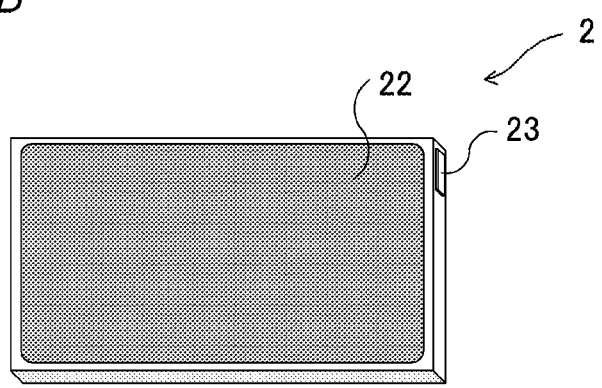

Embodiments of the present invention will be described with reference to the drawings. External configurations of a head mounted display (HMD) and an information terminal according to an imaging system of the present invention will be described first with reference to FIG. 1 and FIGS. 2A and 2B. The external configurations of the HMD and the information terminal illustrated in FIG. 1 and FIGS. 2A and 2B are common to each embodiment described later. The HMD of each embodiment is assumed to be an optical see-through type HMD.

FIG. 1 is an external view of the HMD. The HMD 1 includes a frame and two display units 11a and 11b. The frame includes a rim 15 and temples 16a and 16b bonded to both sides of the rim 15 respectively. The display units 11a and 11b are bonded to one surface of the rim 15.

An image projection unit 12a and a light-guiding unit 13a guide light from a display element (not illustrated) of the display unit 11a to a right eye of the user (wearer) wearing the HMD 1. In the same manner, an image projection 12b and a light-guiding unit 13b guide light from a display element (not illustrated) of the display unit 11b to a left eye of the wearer wearing the HMD 1.

The wearer can perceive images displayed on the display unit 11a and the display unit 11b and an incident light from the front side of the HMD 1 simultaneously. The HMD 1 may include two imaging units (image sensors) 14a and 14b. The imaging unit 14a and the imaging unit 14b photograph the surroundings, including the area to the front of the HMD.

FIGS. 2A and 2B are external views of the information terminal. The information terminal 2 is a terminal device which operates linking with the HMD 1. FIG. 2A indicates an example of a front surface of the information terminal 2. FIG. 2B indicates an example of a rear surface of the information terminal 2. The information terminal 2 is merely a device, that includes an imaging unit (imaging sensor), such as a smartphone, a tablet terminal, or a digital camera, for example.

The information terminal 2 includes an imaging unit (imaging sensor) 21, a display unit 22, and an operation unit 23 (an operation member). In the example of FIG. 2A, the imaging unit 21 is disposed on the front surface of the information terminal 2. One or more imaging units 21 may be disposed on at least one of the front surface and the rear surface of the information terminal 2.

The display unit 22 is a display with a touch panel. The display unit 22 displays such a video image as a live view image (LV image). The touch panel of the display unit 22 receives the input operation via the user' fingers, a stylus pen, or the like. The operation unit 23 is a member to input the operation performed by user, and is buttons, a dial, and the like. The operation unit 23 may be one or more members included in the information terminal 2, and may be implemented by the touch panel of the display unit 22.

Embodiment 1

Embodiment 1 is an embodiment for photographing a subject wearing the HMD 1 in a state where the line-of-sight of the subject is directed to the camera. The subject wearing the HMD 1 can visually recognize both the outside world, including the camera capturing the image, and a video image projected onto the display unit (e.g. LV image) simultaneously, hence in some cases where the subject focuses on the video image, the line-of-sight of the subject may not be directed to the camera capturing the image. Based on the image captured by the information terminal 2, the HMD 1 acquires the position information of the information terminal 2 in the field-of-view of the HMD 1, and controls the display of the HMD 1 so that the line-of-sight of the subject is directed to the information terminal 2.

Figure 3:
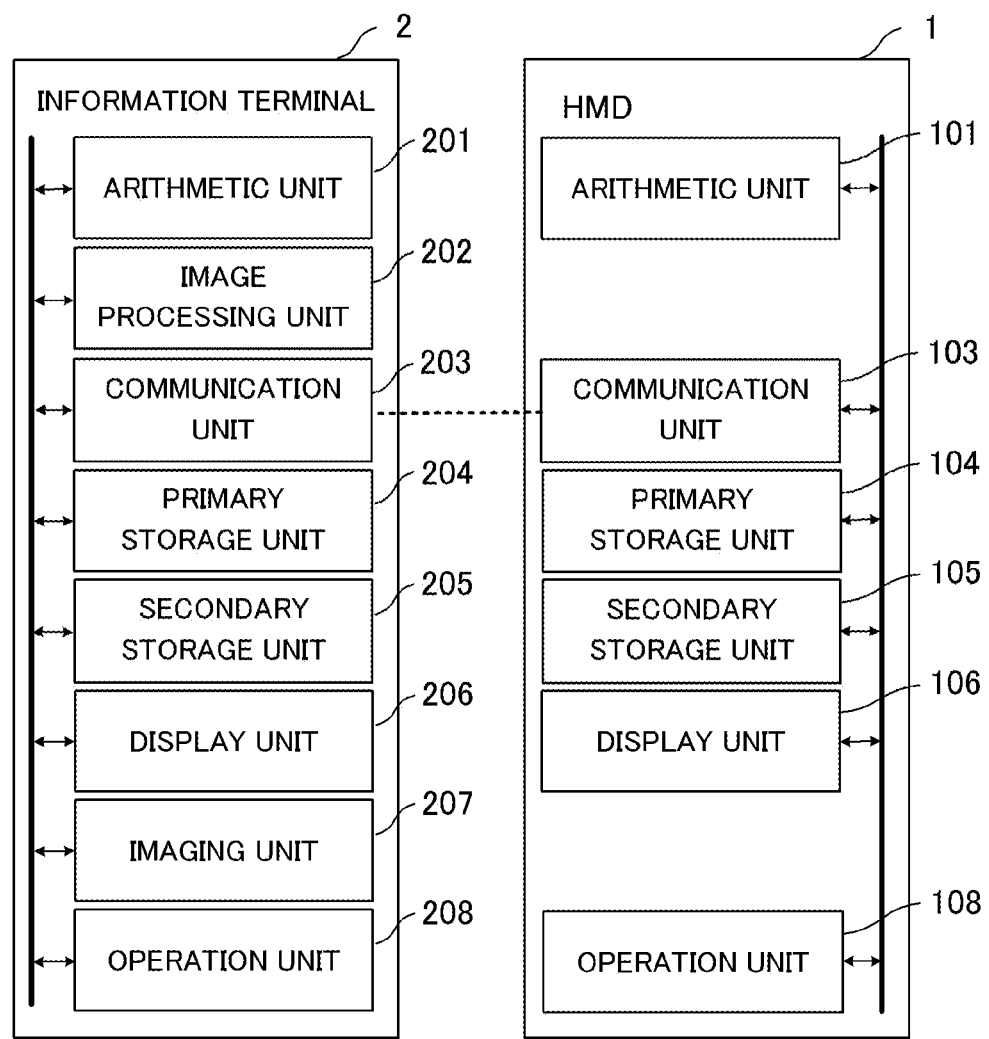
FIG. 3 is a diagram exemplifying hardware configurations of the HMD and the information terminal according to Embodiment 1.

(Hardware Configuration of Embodiment 1): FIG. 3 is a diagram exemplifying the hardware configurations of the HMD 1 and the information terminal 2 according to Embodiment 1. The HMD 1 includes an arithmetic unit 101, a communication unit 103, a primary storage unit 104, a secondary storage unit 105, a display unit 106, and an operation unit 108. The composing elements of the HMD 1 are interconnected via a bus.

The arithmetic unit 101 is a central processing unit (CPU), for example, and controls the HMD 1 in general. The communication unit 103 is an interface to communicate with the information terminal 2. The communication unit 103 can communicate with other devices using such a communication standard as Wi-Fi and/or Bluetooth® low energy (BLE). The primary storage unit 104 is a dynamic random access memory (DRAM), for example, and temporarily stores the image data. The secondary storage unit 105 is a flash memory, for example, and records captured images, and the like. The display unit 106 controls the display of the captured images and other visual objects. The display unit 106 corresponds to the display unit 11a and the display unit 11b of FIG. 1. The operation unit 108 receives the operation input from the user.

The information terminal 2 includes an arithmetic unit 201, a communication unit 203, a primary storage unit 204, a secondary storage unit 205, a display unit 206, and an operation unit 208, just like the HMD 1. The communication unit 203 is an interface to communicate with the HMD 1. The communication unit 203 can communicate with other devices using such a communication standard as Wi-Fi and/or BLE. The display unit 206 corresponds to the display unit 22 in FIGS. 2A and 2B. The operation unit 208 corresponds to a touch panel installed in the operation unit 23 and the display unit 22 in FIGS. 2A and 2B.

The information terminal 2 further includes an image processing unit 202 (a detecting unit) and an imaging unit (imaging sensor) 207. The image processing unit 202 analyzes the image captured by the imaging unit 207, and detects a subject, the HMD 1 worn by the subject, and the like, from the captured image. The imaging unit 207 includes a lens, image pickup elements (CCD or CMOS sensors), and the like, and generates the captured image of the subject. Each composing element of the information terminal 2 is interconnected via a bus.

Figure 4:
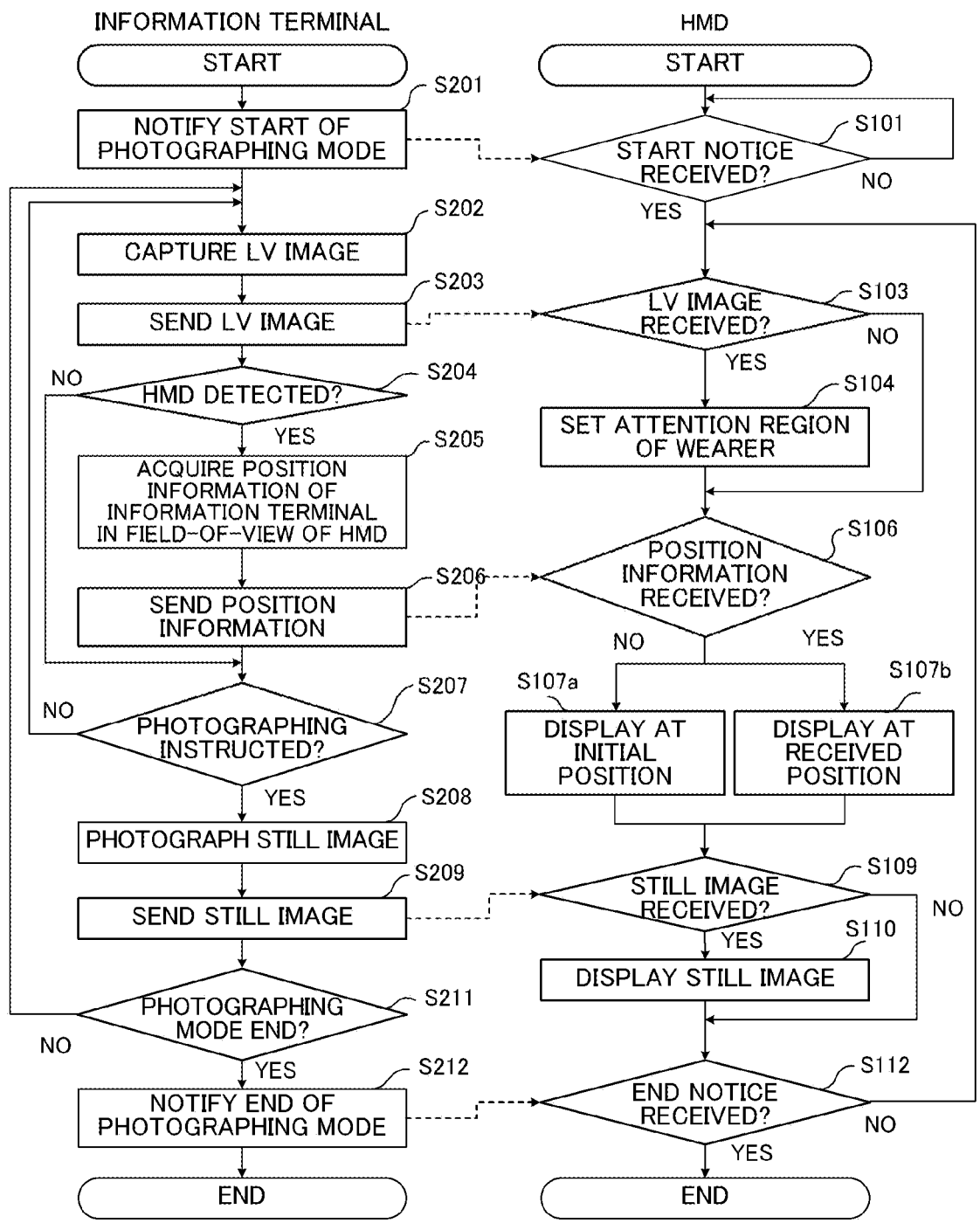
FIG. 4 is a flow chart exemplifying photographing processing steps according to Embodiment 1.

(Photographing Processing of Embodiment 1): FIG. 4 is a flow chart exemplifying a photographing processing of Embodiment 1. In Embodiment 1, the HMD 1 is linked with the information terminal, and adjusts the display positions of the image displayed on the display unit 106 of the HMD 1, and the other objects. The HMD 1 adjusts the display positions based on the information acquired from the captured image of the information terminal 2.

The processing of the information terminal 2 is started when the user (photographer) operates the operation unit 208 and the information terminal 2 enters a photographing mode. The processing of the HMD 1 is started when the wearer turns the power of the HMD 1 ON. The processing in each step in FIG. 4 is implemented by the arithmetic unit 201 of the information terminal 2 and the arithmetic unit 101 of the HMD 1 executing a program that controls the other composing elements indicated in FIG. 3. In the following description, the processing in each step will be described primarily focusing on the arithmetic unit 201 of the information terminal 2, the arithmetic unit 101 of the HMD 1, and other composing elements controlled by these arithmetic units.

In S201, the communication unit 203 notifies the HMD 1 that the photographing mode started. In S101, the communication unit 103 determines whether the photographing mode start notice was received from the information terminal 2. If the photographing mode start notice was received, processing advances to S103. If the photographing mode start notice was not received, the determination processing in S101 is repeated at a predetermined interval, until the start notice is received.

In S202, the imaging unit 207 captures the LV image. In S203, the communication unit 203 sends the LV image captured in S202 to the HMD 1. In S103, the communication unit 103 determines whether the LV image was received from the information terminal 2. Processing advances to S104 if the LV image was received from the information terminal 2, or processing advances to S106 if the LV image was not received from the information terminal 2.

In S104, the arithmetic unit 101 sets an attention region of the wearer of the HMD 1, and acquires the position information on the attention region in the LV image. The position information is information to specify the position of a region, and is the center coordinates and the radius of a circle surrounding the attention region. The position information may be the center coordinates and the size of a rectangle surrounding the attention region, or may be the coordinates of two vertexes on a diagonal line of the rectangle. Further, the position information may be an ID or a name to identify each region in a case where the display region of the HMD 1 is divided into a plurality of regions.

The attention region of the wearer may be set at an arbitrary position of an image. For example, the attention region of the wearer may be a center region of the LV image, a region of the face of the wearer of the HMD 1, a focused region of the imaging unit 207, a point which the wearer is indicting, and an object region currently under operation. Further, in a case where the HMD 1 includes a line-of-sight detecting device, the arithmetic unit 101 may set an attention region to a region where the line-of-sight of the wearer is directed.

In S204, the image processing unit 202 determines whether the HMD 1 is detected in the captured LV image. The image processing unit 202 detects the HMD in the LV image based on the image of the HMD 1 and the feature data thereof, which are recorded in the secondary storage unit 205 in advance. Processing advances to S205 if the HMD 1 is detected in the LV image, or processing advances to S207 if the HMD 1 is not detected in the LV image.

In S205, the image processing unit 202 acquires the position information of the information terminal 2 within a field-of-view (display region) of the HMD 1. The position information is information to specify the position of the information terminal 2 in the field-of-view of the HMD 1, and is the center coordinates and the radius of a circle surrounding the information terminal 2, for example. The position information may be the center coordinates and the size of a rectangle surrounding the information terminal 2, or may be the coordinates of two vertexes on the diagonal line of the rectangle. Further, the position information may be an ID or a name to identify each region in a case where the display region of the HMD 1 is divided into a plurality of regions. The position information of the information terminal 2 in the field-of-view of the HMD 1 can be acquired by a known geometric operation based on a position, size, inclination and brightness of the HMD 1 detected in S204 and its positional relationship with other objects.

The position information acquired in S205 may be information that indicates a two-dimensional or a three-dimensional position. The position information acquired in S205 may also be two different sets of coordinates that indicate the display positions of the information terminal 2 in the left and right display units 11a and 11b of the HMD 1 respectively, or may be the same coordinates.

In S206, the communication unit 203 sends the position information acquired in S205 to the HMD 1. In S106, the communication unit 103 determines whether the position information was received from the information terminal 2. Processing advances to S107a if the position information was received from the information terminal 2, or processing advances to S107b if the position information was not received from the information terminal 2.

The display format of the captured image on the HMD 1 is controlled so as to be different depending on whether the position information was received from the information terminal 2 or not. In other words, the display unit 106 controls such that the display format of the captured image is different depending on whether the HMD 1 was detected in the captured image or not. The display format indicates the position, the size, and the like, of the captured image displayed on the HMD 1, for example.

In S107a, based on the predetermined initial position, the display unit 106 displays at least one of the LV images received in S103, and other content. Here an example of the image display in S107a will be described with reference to FIG. 5.

Figure 5:
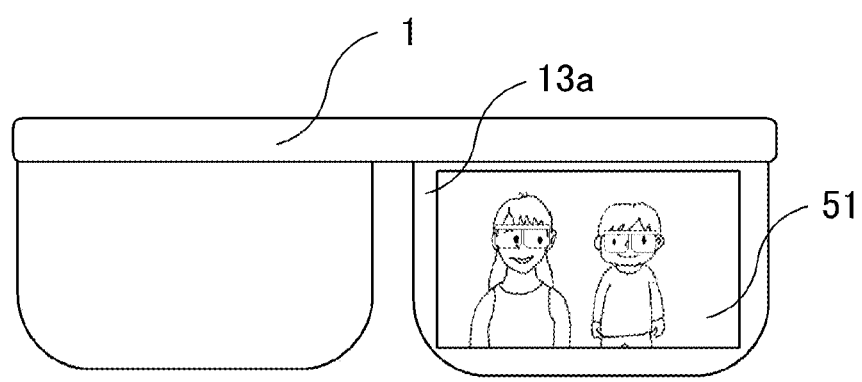
FIG. 5 is a diagram indicating an example of displaying an LV image at an initial position.

FIG. 5 is a diagram indicating an example of displaying an LV image at an initial position. In FIG. 5, the LV image 51 is displayed on the light-guiding unit 13a of the HMD 1. The LV image, which the information terminal 2 captured in S202, is displayed at a predetermined initial position of the HMD 1.

The initial position may be, for example, coordinates to specify the center position of the LV image, or a set of coordinates to specify two vertexes on a diagonal line of the LV image. Further, the LV image at a predetermined size may be displayed at the initial position. In this case, the initial position is not limited to the coordinates to specify the center position of the LV image, but may be coordinates to specify any one of the vertexes at the four corners of the LV image. The LV image is displayed based on the initial position and the predetermined size. The LV image is displayed at the center of the display region of the HMD 1 as the initial position, for example. In the example in FIG. 5, the LV image is displayed on the entire surface of the display region of the HMD 1.

FIG. 5 indicates an example of displaying the LV image on the display unit 11a on the right side, but actually the LV image is displayed on both the display unit 11a and the display unit 11b on the left and right sides. The images displayed on the display unit 11a and the display unit 11b on the left and right sides may be the same image, or may be different images. The initial positions that are set for the display unit 11a and the display unit 11b may be at different coordinates.

In S107b in FIG. 4, based on the position information received in S106 and the attention region of the wearer that was set or computed in S104, the display unit 106 displays at least one of the LV images received in S103, and other content. In other words, the display unit 106 displays the content, such as the LV image, so that the attention region of the wearer overlaps with the position (coordinates) of the information terminal 2. In S107a and S107b, the display unit 106 displays not only the LV image, but also the content related to the processing executed by the arithmetic unit 101 and the arithmetic unit 201. Here an example of the image display in S107b will be described with reference to FIGS. 6A to 6C.

Figure 6A:
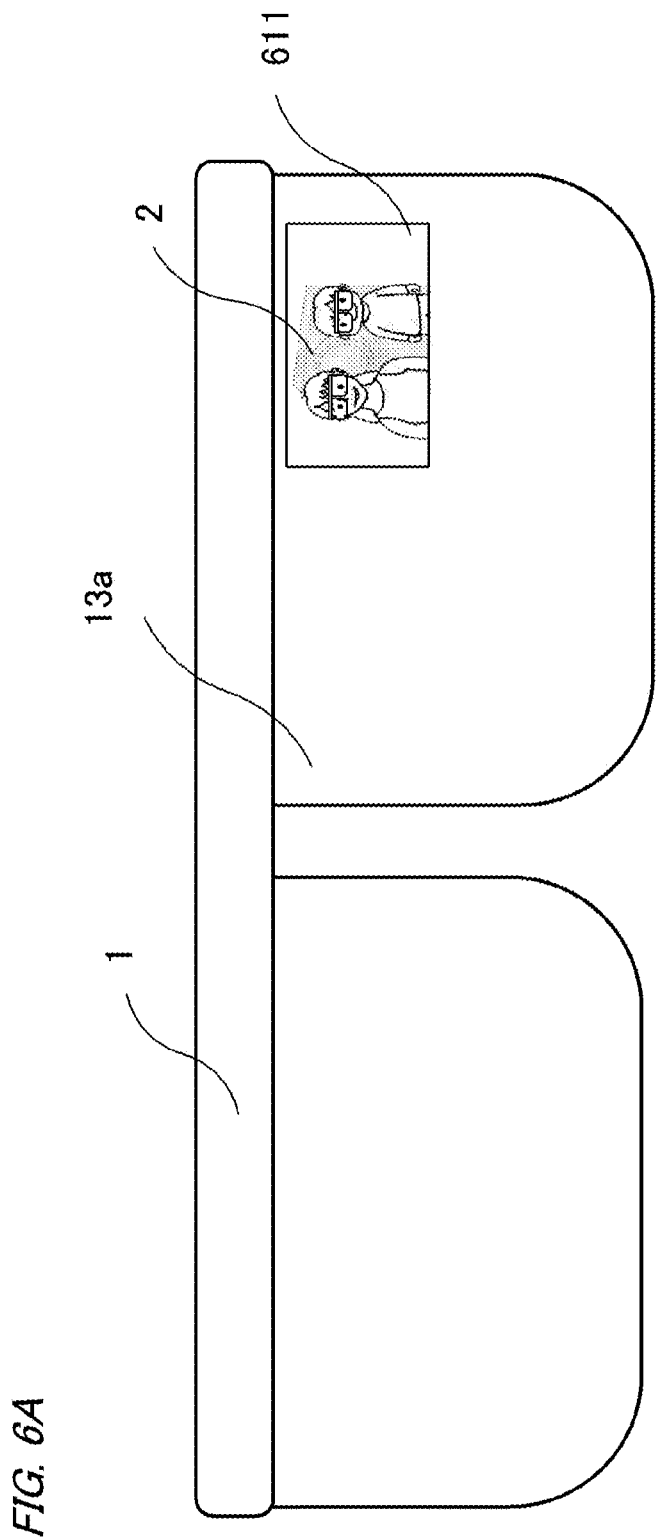
FIGS. 6A to 6C are diagrams indicating an example of displaying an LV image at adjusted coordinates.
Figure 6B:
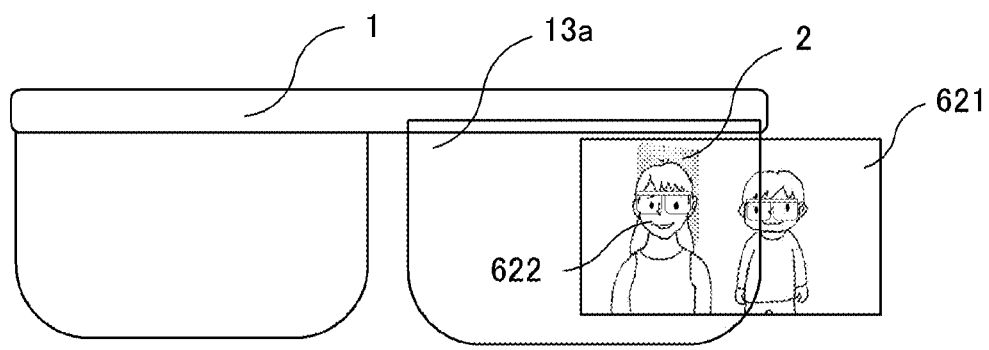
Figure 6C:
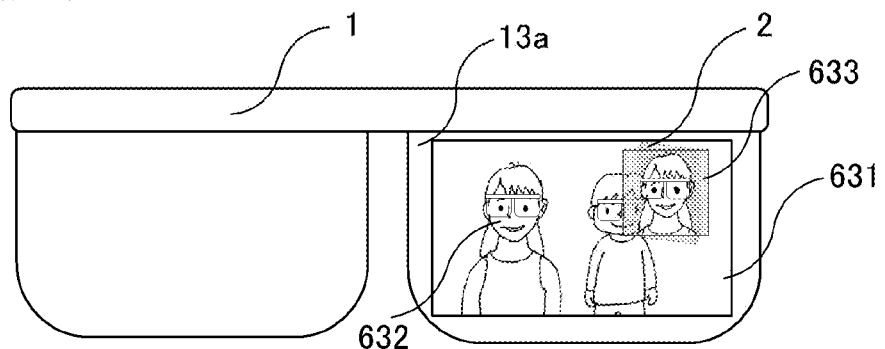

FIGS. 6A to 6C are diagrams indicating an example of displaying an LV image at adjusted coordinates. The LV image, which the information terminal 2 captured in S202, is displayed at a position adjusted based on the position information received in S106 within the display region of HMD 1. Specifically, the LV image is displayed based on the coordinates of the information terminal 2 in the field-of-view (display region) of the HMD 1.

FIG. 6A is an example of displaying the LV image 611 in a reduced state at a position overlapping with the information terminal 2 which is transparently displayed. The reference coordinates used for adjusting the position of the LV image 611 can be any coordinates on the LV image 611. The reference coordinates of the LV image 611 are coordinates used for determining a position that overlaps with the information terminal 2, and are the coordinates of the four corners of the LV image 611, for example.

The reference coordinates of the information terminal 2 used for adjusting the position of the LV image 611 can be any coordinates where the information terminal 2 exists in the display region. The reference coordinates of the information terminal 2 are coordinates used for determining a position where the LV image overlaps with the information terminal 2, and are the coordinates of the center of the information terminal 2.

FIG. 6B is an example of displaying a face of a subject 622 in an LV image 621 at a position overlapping with the information terminal 2, as an attention region of the wearer of the HMD 1. The region of the face of the subject 622, which is a region of interest of the wearer in the LV image 621, can be detected by a known method using the image processing unit 202 of the information terminal 2.

The reference coordinates used for adjusting the position of the LV image 621 can be any coordinates in the region of the face of the subject 622. The reference coordinates of the information terminal 2 can be any coordinates where the information terminal 2 exists in the display region. In FIG. 6B, a partial region 621 of the LV image cannot be within the region of the light-guiding unit 13a, hence the display unit 11a displays a region which is within the region of the light-guiding unit 13a, out of the LV image. The region that is outside the region of the light-guiding unit 13a is disposed at virtual coordinates. The region that is outside the region of the light-guiding unit 13a is displayed in a case where the orientation of the HMD 1 changes and the region of the light-guiding unit 13a changes accordingly.

FIG. 6C is an example of displaying the LV image 631 at a predetermined initial position, out of the display region of the HMD 1, just like FIG. 5, and displaying a trimmed image 633 of the face of the subject 632 at a position overlapping with the information terminal 2. The reference coordinates used for adjusting the position of the trimmed image 633 can be any coordinates within the trimmed image. The reference coordinates of the information terminal 2 can be any coordinates where the information terminal 2 exits in the display region.

In S207 in FIG. 4, the operation unit 208 determines whether the photographing instruction for a still image was received from the photographer. Processing advances to S208 if the photographing instruction for a still image was received, or processing returns to S202 if the photographing instruction for a still image was not received.

In S208, the imaging unit 207 photographs the still image. The photographed still image is appropriately image-processed by the image processing unit 202. In S209, the communication unit 203 sends the still image photographed in S208 to the HMD 1. In S109, the communication unit 103 determines whether the still image data was received from the information terminal 2. Processing advances to S110 if the still image data was received, or processing advances to S112 if the still image data was not received. In step S110, the display unit 106 displays the still image received in S109. The still image may be displayed based on the predetermined initial position, or may be displayed based on the coordinates received in S106.

In S211, the operation unit 208 determines whether the end of the photographing mode was instructed from the photographer. Processing advances to S212 if the end of the photographing mode was instructed, or processing returns to S202 if the end of the photographing mode was not instructed.

In S212, the communication unit 203 notifies the HMD 1 that the end of the photographing mode was instructed, and the photographing processing of the information terminal 2 in FIG. 4 ends. In S112, the communication unit 103 determines whether the end notice of the photographing mode was received from the information terminal 2. Processing of the HMD 1 in FIG. 4 ends if the end notice of the photographing mode was received, or processing returns to S103 if the end notice of the photographing mode was not received.

The processing steps to send the LV image from the information terminal 2 to the HMD 1 (S202, S203, S103), and the processing steps to send the still image from the information terminal 2 to the HMD 1 and display the still image on the display unit 106 (S209, S109, S110) need not be executed. In other words, the HMD 1 may display the LV image which the information terminal 2 is capturing and the photographed still image on the display unit 106, and have the wearer of the HMD 1, which is the subject, view these images, or may display other display content without displaying the LV image and the photographed still image.

In Embodiment 1, the HMD 1 acquires the position information of the information terminal 2 in the display region of the HMD 1 from the information terminal 2, and displays the LV image, the still image and other display content based on the acquired position of the information terminal 2. In other word s, the LV image, the still image and other display content are displayed so as to overlap with the information terminal 2 in the display region of the HMD 1. The wearer of the HMD 1, which is the subject, can view the direction of the information terminal 2 photographing while paying attention to the LV image, the still image and other display content. Therefore the information terminal 2 can photograph an image in which the line-of-sight of the subject wearing the HMD 1 is directed to the camera, even if the subject is viewing an image, and the like, displayed in the display unit 106.

Out of the processing steps of the information terminal 2 indicated in FIG. 4, the processing steps, to detect the HMD 1 in the LV image and acquire the position information of the information terminal 2 in the field-of-view of the HMD 1 (S204, S205), may be executed by the HMD 1. By the HMD 1 executing a part of the processing steps performed by the information terminal 2, the information terminal 2 can lessen the processing load of the information terminal 2 in the case of photographing a plurality of wearers of an HMD 1.

Embodiment 2

Just like Embodiment 1, Embodiment 2 is an embodiment for photographing a subject wearing the HMD 1 in a state where the line-of-sight of the subject is directed to the camera. However, in Embodiment 2, unlike Embodiment 1, the HMD 1 controls display of the HMD 1 based on the image that the HMD 1 photographed. In Embodiment 2, even if the information terminal 2 is connected to a plurality of HMDs 1, each HMD 1 can implement an appropriate display at an appropriate timing by controlling the display of the HMD 1 based on the image the HMD 1 itself captured. The HMD 1 may be a video see-through type HMD, which captures the video image of the outside world and electronically combines the video image with the video image of a virtual world.

Figure 7:
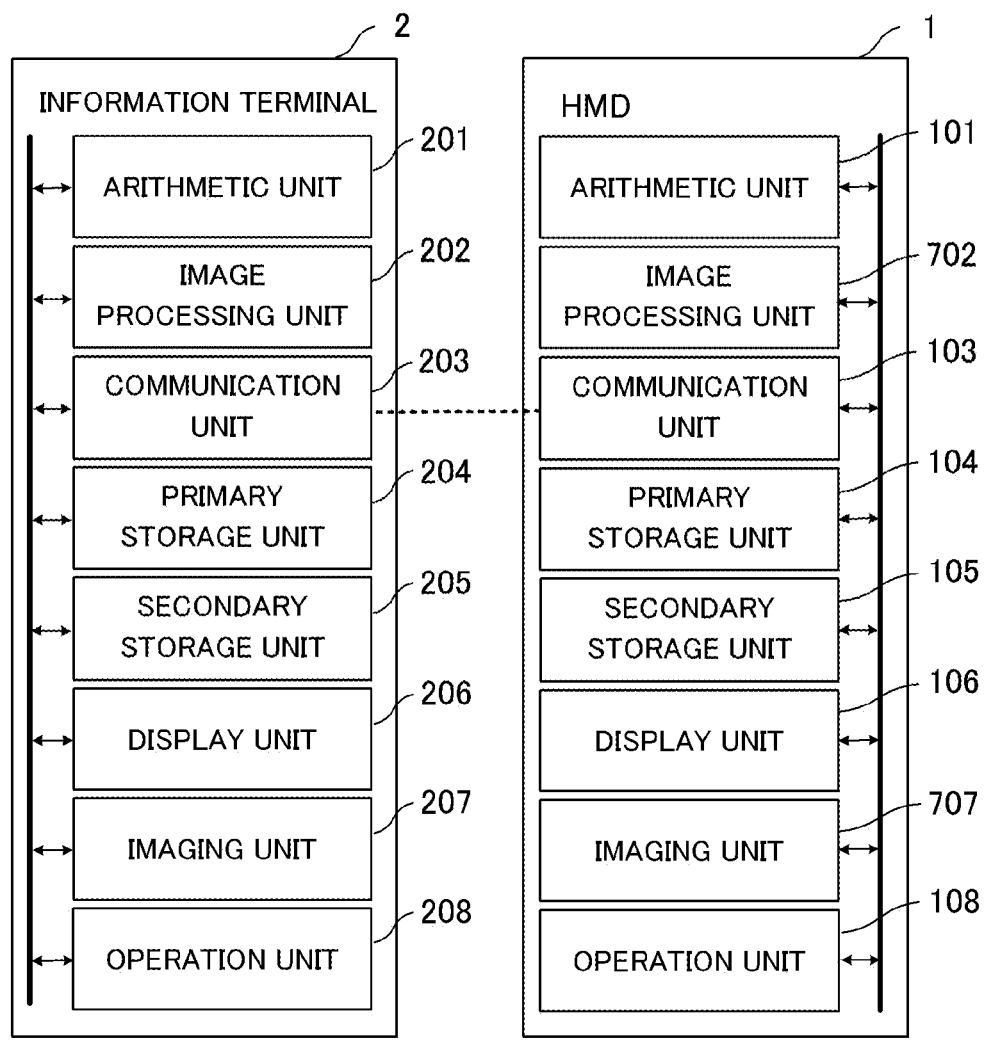
FIG. 7 is a diagram exemplifying hardware configurations of an HMD and an information terminal according to Embodiment 2.

(Hardware Configuration of Embodiment 2): FIG. 7 is a diagram exemplifying hardware configurations of the HMD 1 and the information terminal 2 according to Embodiment 2. The hardware configurations of Embodiment 2 are essentially the same as the hardware configurations of Embodiment 1, hence only the differences from Embodiment 1 will be described.

In Embodiment 2, the HMD 1 includes an image processing unit 702 and an imaging unit (imaging sensor) 707 in addition to the hardware configuration of Embodiment 1 indicated in FIG. 3. The imaging unit 707 corresponds to the imaging unit 14a and the imaging unit 14b in FIG. 1. The imaging unit 707 photographs a surrounding image including a front area. The imaging unit 707 may detect a line-of-sight of the wearer of the HMD 1 as the line-of-sight detecting device.

The image processing unit 702 processes the image photographed by the imaging unit 707, and acquires the information to control display of the HMD 1. The information to control display of the HMD 1 is information to indicate the position of the information terminal 2 detected from the captured image, for example.

Figure 8:
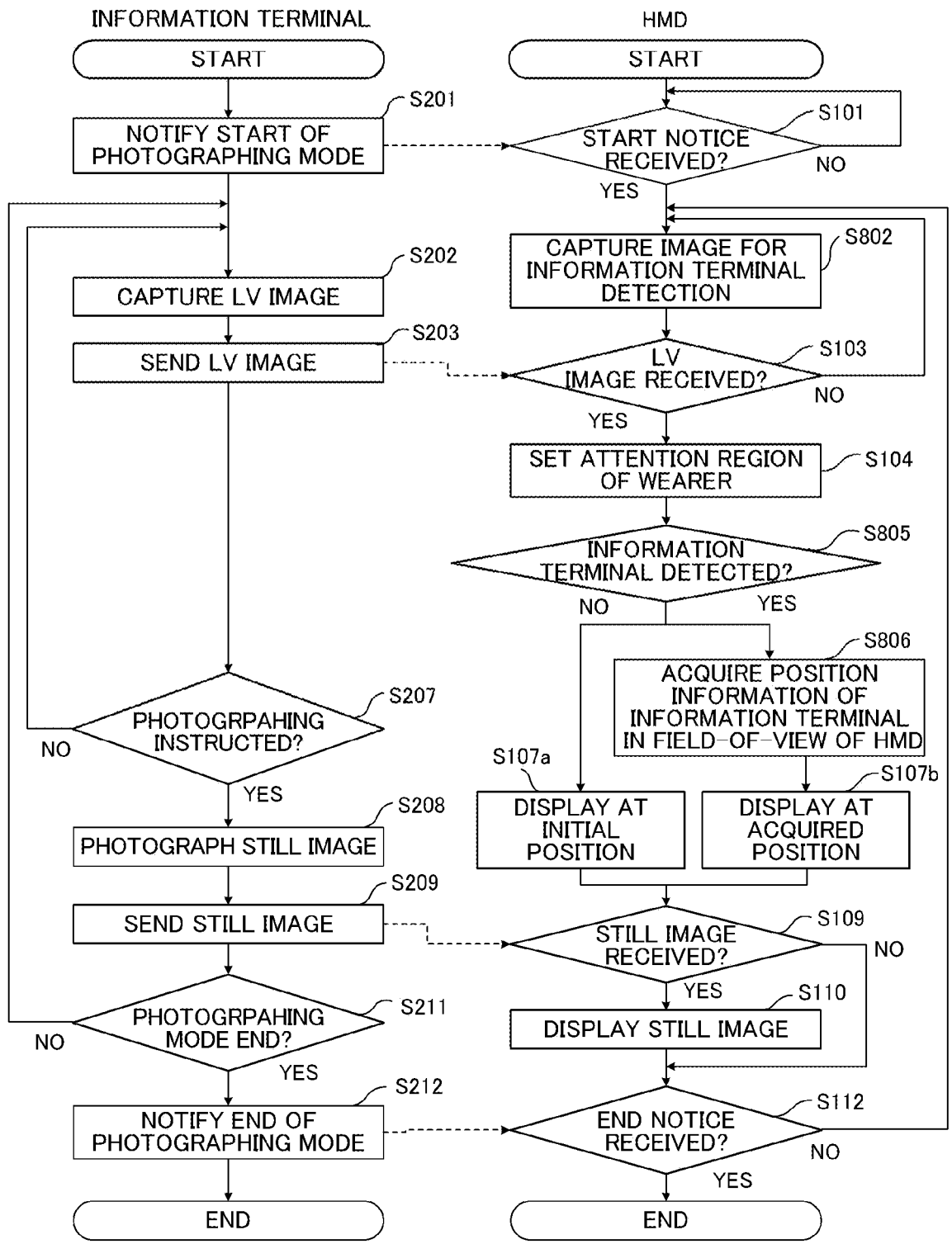
FIG. 8 is a flow chart exemplifying photographing processing steps according to Embodiment 2.

(Photographing processing of Embodiment 2): FIG. 8 is a flow chart exemplifying the photographing processing of Embodiment 2. In Embodiment 2, the HMD 1 links with the information terminal 2, and adjusts the display positions of an image displayed on the display unit 106 of the HMD 1 and other objects. The HMD 1 adjusts the display positions based on the information acquired from the captured image of the HMD 1.

The processing of the information terminal 2 is started when the photographer operates the operation unit 208 and the information terminal 2 enters the photographing mode, for example. The processing of the HMD 1 is started when the wearer turns the power of the HMD 1 ON, for example. The processing in each step of FIG. 8 is implemented by the arithmetic unit 201 of the information terminal 2 and the arithmetic unit 101 of the HMD 1 executing a program that controls other composing elements indicated in FIG. 7. In the following description, the processing in each step will be described primarily focusing on the arithmetic unit 201 of the information terminal 2, the arithmetic unit 101 of the HMD 1, or other compositing elements controlled by these arithmetic units.

A same processing step as that in FIG. 4 will be denoted with a same reference sign, and detailed description thereof will be omitted. The processing steps in S201 to S203 of the information terminal 2 and the processing step in S101 of the HMD 1 are the same as Embodiment 1. When the photographing mode start notice is received from the information terminal 2 in S101, processing advances to S802. In S802, the imaging unit 707 captures an image for detection to detect the information terminal 2.

The processing steps in S103 and S104 of the HMD 1 are the same as Embodiment 1. In the case where the LV image was not received from the information terminal 2 in S103, processing returns to S802, and the processing steps in S802 and S103 are repeated until the LV image is received.

In S805, the image processing unit 702 determines whether the information terminal 2 was detected within the image for detection captured in S802. The image processing unit 702 detects the information terminal 2 within the image for detection based on the image of the information terminal 2 and the feature data thereof, which are recorded in the secondary storage unit 105 in advance. Processing advances to S806 if the information terminal 2 was detected within the image for detection, or processing advances to S107a if the information terminal 2 was not detected.

In S806, the image processing unit 702 acquires the position information of the information terminal 2 within a field-of-view (display region) of the HMD 1. The position information of the information terminal 2 may be information on the coordinates calculated from the position of the information terminal 2 detected in S805. The position information acquired in S805 may be a separate two sets of coordinates, which indicate the display positions of the information terminal 2 in the left and right display unit 11a and 11b of the HMD 1 respectively, or may be the same coordinates.

The processing steps in S107a, S107b, and S109 to S112 of the HMD 1 and the processing steps in S207 to S212 of the information terminal 2 are the same as Embodiment 1. If the photographing mode end notice was not received in S112, processing returns to S802. In S107a and S107b, the HMD 1 may control the display in the same manner as FIG. 5 and FIGS. 6A to 6C described in Embodiment 1.

In Embodiment 2, the HMD 1 detects the information terminal 2 from the image for detection captured by the imaging unit 707, acquires position information on the information terminal 2 and displays the LV image, still image and other display content based on the acquired position of the information terminal 2. In other words, the LV image, still image and other display content are displaced so as to overlap with the information terminal 2 within the display region of the HMD 1. The wearer of the HMD 1, which is the subject, can view the direction of the information terminal 2 during photographing while paying attention to the LV image, still image and other display content. Therefore the information terminal 2 can photograph an image in which the line-of-sight of the subject wearing the HMD 1 is directed to the camera, even if the subject is viewing an image, and the like, displayed on the display unit 106.

By using the detection result of the information terminal 2 using the image captured by the HMD 1, the communication between the HMD 1 and the information terminal 2 can be reduced. Furthermore, even in a state where a plurality of HMDs 1 are connected to the information terminal 2, each HMD 1 can appropriately control the display.

Embodiment 3

Embodiment 3 is an embodiment for appropriately photographing of a subject wearing the HMD 1 within the photographing angle of view of an imaging unit, such that the projection light to the display unit 106 of the HMD 1 does not overlap with the eyes of the subject.

In a case where a subject wearing the HMD 1, to which a video image is projected, is photographed, the eyes of the subject may not be appropriately photographed since the projected light to the HMD 1 is captured on the display unit 106 of the HMD 1. Therefore in the case where the photographing instruction for a still image was received from the photographer, the information terminal 2 detects the HMD 1 in the captured image, and notifies the detected HMD 1 that the photographing instruction was received. The HMD 1 that received the notice can move the display or hide the display on the HMD 1 so that the projected light on the display unit 106 does not overlap with the eyes of the subject when still image is photographed.

(Hardware Configuration of Embodiment 3): The hardware configurations of the HMD 1 and the information terminal 2 according to Embodiment 3 are essentially the same as the hardware configurations of Embodiment 1 indicated in FIG. 3, hence the description thereof will be omitted.

Figure 9:
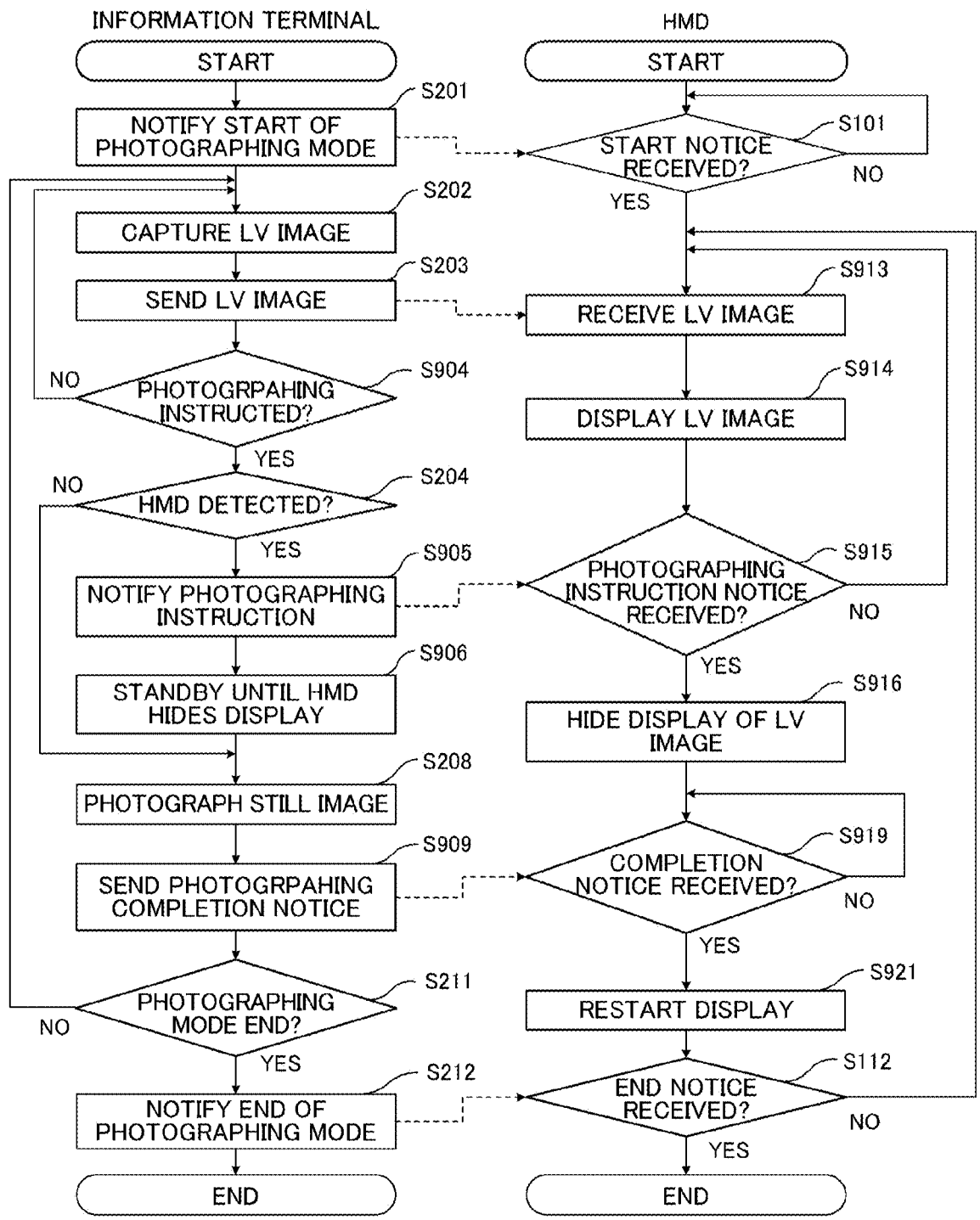
FIG. 9 is a flow chart exemplifying photographing processing steps according to Embodiment 3.

(Photographing Processing of Embodiment 3): FIG. 9 is a flow chart exemplifying a photographing processing of Embodiment 3. In Embodiment 3, the HMD 1 links with the information terminal 2, and adjusts the display of the HMD 1 such that the projected light to the display unit 106 does not overlap with the eyes of the subject when a still image is photographed.

The processing of the information terminal 2 is started when the photographer operates the operation unit 208, and the information terminal 2 enters the photographing mode, for example. The processing of the HMD 1 is started when the wearer turns the power of the HMD 1 ON, for example. The processing in each step in FIG. 9 is implemented by the arithmetic unit 201 of the information terminal 2 and the arithmetic unit 101 of the HMD 1 executing a program that controls other composing elements indicated in FIG. 3. In the following description, the processing in each step will be described primarily focusing on the arithmetic unit 201 of the information terminal 2, the arithmetic unit 101 of the HMD 1, or other composing elements controlled by these arithmetic units.

A same processing step as that in FIG. 4 will be denoted with a same reference sign, and detailed description thereof will be omitted. The processing steps in S201 to S203 of the information terminal 2 and the processing step in S101 of the HMD 1 are the same as Embodiment 1. When the photographing mode start notice is received from the information terminal 2 in S101, processing advances to S913. In S913, the HMD 1 receives the LV image from the information terminal 2. In S914, the HMD 1 displays the LV image received in S913 on the display unit 106.

In S904, the operation unit 208 determines whether the photographing instruction for a still image was received. Processing advances to S204 if the photographing instruction for a still image was received, or processing returns to S202 if the photographing instruction for a still image was not received.

In S204, the image processing unit 202 determines whether the HMD 1 was detected within the captured LV image. Processing advances to S905 if the HMD 1 was detected within the LV image, or processing advances to S208 if the HMD 1 was not detected within the LV image.

In S905, the communication unit 103 notifies the HMD 1 that the still image photographing instruction was received from the photographer via the operation unit 208. In S915, the communication unit 103 determines whether the photographing instruction notice was received from the information terminal 2. Processing advances to S916 if the photographing instruction notice was received, or processing returns to S913 if the photographing instruction notice was not received. The processing steps from S913 to S915 are repeated until the photographing instruction notice is received.

In S916, the display unit 106 hides the display of the LV image received from the information terminal 2. In S906, the imaging unit 207 stands by until the HMD 1 hides the display of the LV image in S916. For this standby, the imaging unit 207 may advance processing to S208 and photograph the still image after standing by for a predetermined time, for example. The imaging unit 207 may standby until the communication unit 203 receives the notice of the end of hiding of the LV image from the communication unit 103 of the HMD 1.

After the standby in S906, the imaging unit 207 photographs the still image in S208. After the photographing processing of the still image completes, the communication unit 203 sends the still image photographing completion notice to the HMD 1 in S909.

In S919, the communication unit 103 determines whether the photographing completion notice was received. Processing advances to S921 if the photographing completion notice was received. If the photographing completion notice was not received, the determination processing in S919 is repeated at a predetermined interval until the photographing completion notice is received. The display unit 106 continuously hides the display of the LV image until the photographing completion notice is received.

In S919, the display unit 106 restarts the display of the LV image that is received from the information terminal 2. In S112, the communication unit 103 determines whether the photographing mode end notice was received from the information terminal 2. The processing of the HMD 1 in FIG. 9 ends if the photographing mode end notice was received, or processing returns to S913 if the photographing mode end notice was not received. The processing steps in S211 and S212 are the same as the processing steps in Embodiment 1.

The processing steps to send the LV image from the information terminal 2 to the HMD 1 and display the LV image on the display unit 106 (S202, S203, S913, S914) need not be executed. The HMD 1 may display the LV image, which the information terminal 2 is capturing, and the photographed still image on the display unit 106, and have the wearer of the HMD 1, which is the subject, view these images, or may display other display content without displaying the LV image and the photographed still image.

Figure 10A:
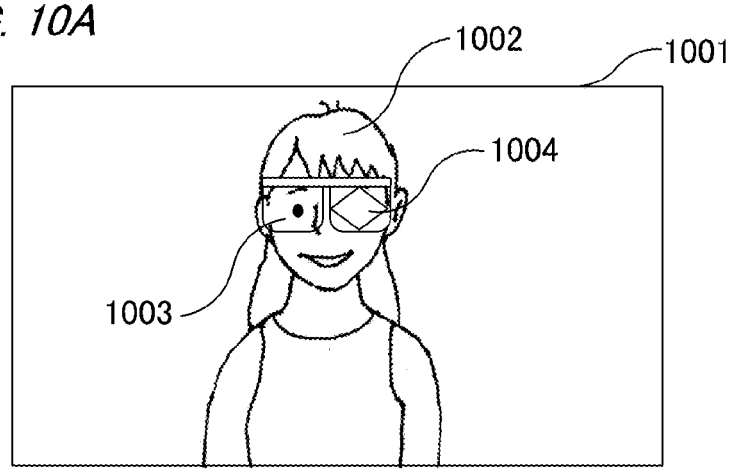
FIGS. 10A to 10C are diagrams exemplifying LV images captured by the information terminal according to Embodiment 3.
Figure 10B:
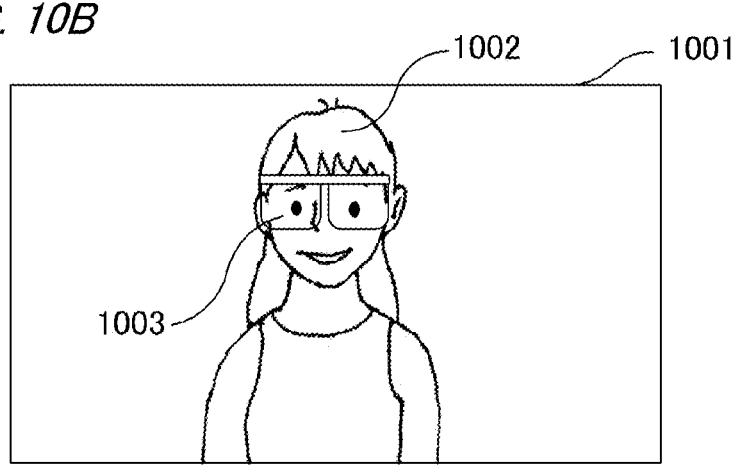
Figure 10C:
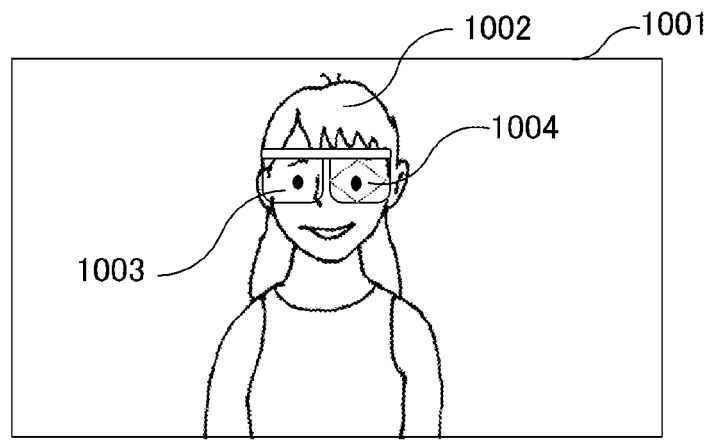

Here an example of the live image captured by the information terminal 2 will be described with reference to the FIGS. 10A to 10C. FIGS. 10A to 10C indicate examples of the LV images where a subject 1002 wearing an HMD 1003 is captured in a photographing angle of view 1001 of the information terminal 2. In FIGS. 10A and 10C, a projected light 1004 of the HMD 1003 is captured overlapping with the eye of the subject 1002.

FIG. 10A is an example of an LV image that is captured in S202, and is displayed on the display unit 106 of the HMD 1 in S914. In FIG. 10A, the projected light 1004 of the HMD 1003 is captured overlapping with the eye of the subject 1002, and covers the eye of the subject 1002. For this reason, the face of the subject 1002 is not captured well. FIG. 10A indicates an example where the projected light 1004 overlaps with the left eye of the subject 1002, but the same event could occur to either the left or the right eye.

FIG. 10B is an example of an LV image that is captured by the information terminal 2 when the HMD 1 is hiding the display of the LV image in S916. In Embodiment 3, the HMD 1 controls such that the projected light is not emitted while a still image is being photographed. Therefore when the information terminal 2 is photographing a still image, the projected light is not displayed on the HMD 1, and the eyes of the subject 1002 are displayed in a state where the projected light does not overlap, as indicated in the example in FIG. 10B. As a result, the face of the subject 1002 can be photographed well.

FIG. 10C is an example in a case where the display of the LV image of the HMD 1 is not hidden, but is controlled to be unnoticeable in the processing in S916. In the photographing processing in FIG. 9, the HMD 1 hides the display of the LV image while the information terminal 2 is photographing the still image, but the present invention is not limited to this. In S916, the HMD 1 may control the display such that the projected light is not noticeable. For example, as indicated in FIG. 10C, the display unit 106 of the HMD 1003 decreases the brightness of the LV image, whereby the eyes of the subject 1002 can be photographed well. And instead of brightness, the display unit 106 may control the display by adjusting the visual features of the image to be displayed, including the size, transparency, color and shape.

In S916, the HMD 1 may adjust the display size of the LV image to photograph the subject well. Further, the image processing unit 202 may acquire the positions of the projected light and the eyes within the captured LV image on the HMD 1, and the HMD 1 may move the projected light to a position that does not overlap with the eyes of the subject. Furthermore, based on the positions of the projected light and the eyes, the HMD 1 may hide or decrease the brightness of the display of the region overlapping with the eyes in the LV image, or adjust the display size of the region, so as to adjust the display state thereof.

In Embodiment 3, the HMD 1 adjusts the display on the display unit 106 while the information terminal 2 is photographing the still image. By the HMD 1 controlling the display on the display unit 106, the information terminal 2 can photograph the still image of the wearer of the HMD 1 (subject) such that the projected light to the HMD 1 does not overlap with the eyes of the subject.

Embodiment 4

Embodiment 4 is an embodiment for supporting appropriate photographing of a subject wearing the HMD 1 by displaying information to assist photographing, which is based on photographing parameters of the information terminal 2, on the HMD 1.

In Embodiment 4, the HMD 1 determines the favorable photographing range, which indicates a range where the subject can be photographed well, based on the position information of the HMD 1 and the information terminal 2, and the photographing parameters of the information terminal 2. The HMD 1 controls the display of the HMD 1 based on the information on the favorable photographing range.

In a case where the HMD 1 which the subject is wearing is outside the favorable photographing range of the information terminal 2, the HMD 1 displays moving information to guide the subject to the favorable photographing range. The favorable photographing range is a range where the subject is photographed in a focused state within the angle of view, for example. By displaying the moving information on the HMD 1, the information terminal 2 can guide the subject wearing the HMD 1 to the favorable photographing range and photograph the subject well.

Figure 11:
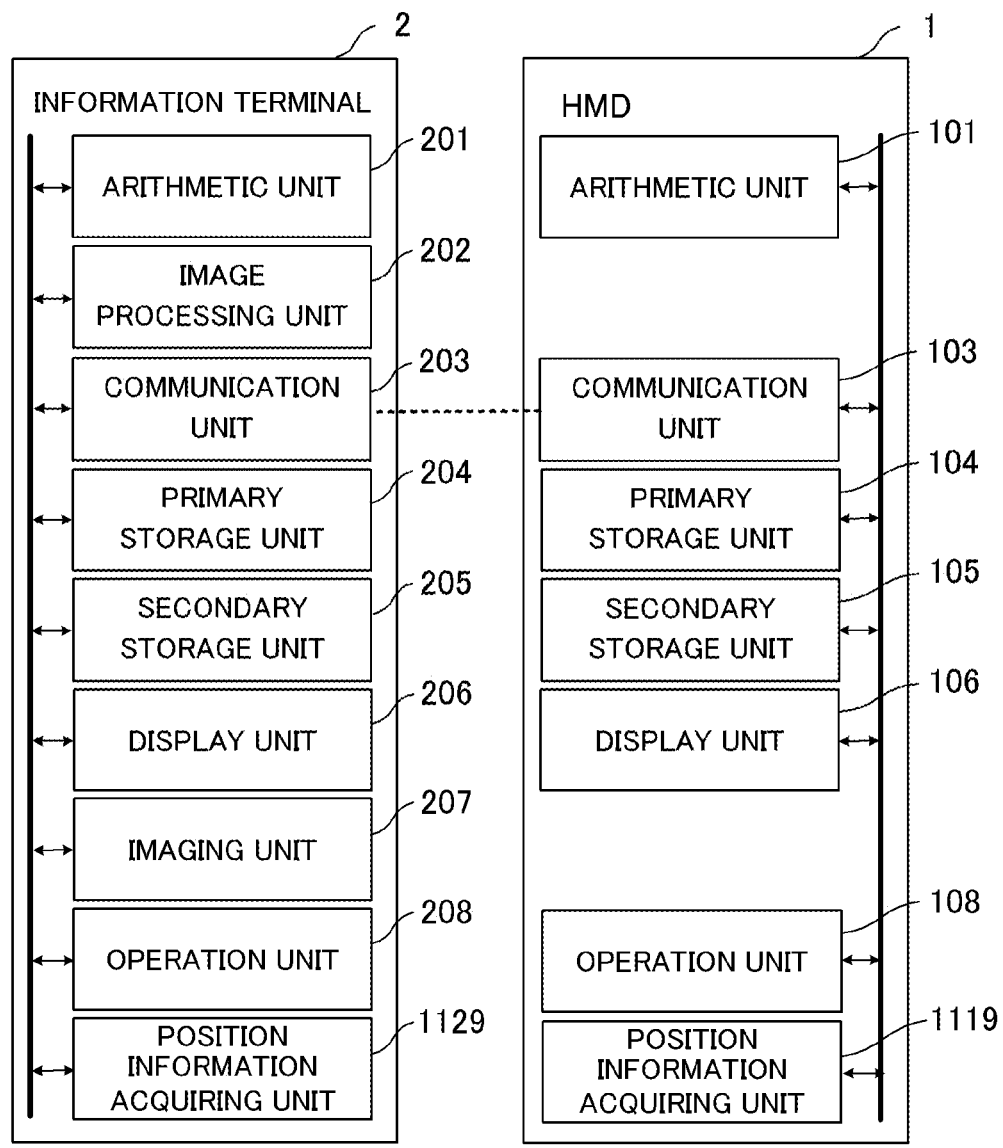
FIG. 11 is a diagram exemplifying hardware configurations of an HMD and an information terminal according to Embodiment 4.

(Hardware Configuration of Embodiment 4): FIG. 11 is a diagram exemplifying hardware configurations of the HMD 1 and the information terminal 2 according to Embodiment 4. The hardware configurations of Embodiment 4 are essentially the same as the hardware configurations of Embodiment 1, hence only the differences from Embodiment 1 will be described.

In Embodiment 4, the HMD 1 includes a position information acquiring unit 1119, and the information terminal 2 includes a position information acquiring unit 1129, in addition to the hardware configuration of Embodiment 1 indicated in FIG. 3. The position information acquiring unit 1119 and the position information acquiring unit 1129 acquire the position information on the HMD 1 and the information terminal 2 using GPS, for example.

The information terminal 2 transfers the photographing parameters of the imaging unit 207 to the arithmetic unit 201. The arithmetic unit 201 calculates the favorable photographing range using the photographing parameters. The photographing parameters are, for example, a size of the image sensor, a focal distance, a permissible diameter of circle of confusion, an aperture value, and the like. The arithmetic unit 201 generates the moving information to assist moving with respect to the HMD 1, based on the position information of the HMD 1 and the favorable photographing range of the information terminal 2.

Figure 12:
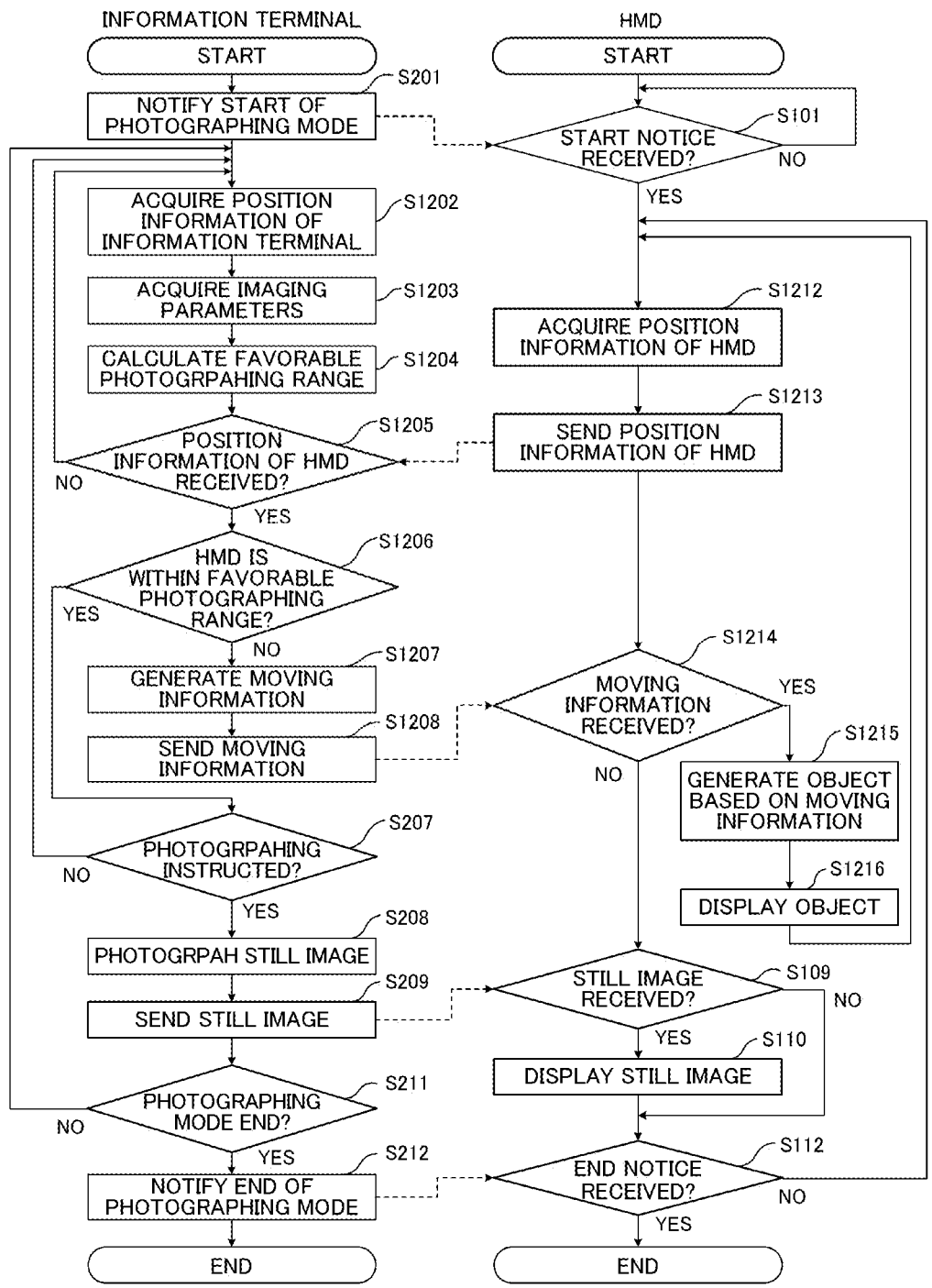
FIG. 12 is a flow chart exemplifying photographing processing steps according to Embodiment 4.

(Photographing Processing of Embodiment 4): FIG. 12 is a flow chart exemplifying the photographing processing of Embodiment 4. In Embodiment 4, the HMD 1 displays information to guide the moving of the HMD 1 on the display unit 106 of the HMD 1, based on the moving information generated by the information terminal 2.

The processing of the information terminal 2 is started when the photographer operates the operation unit 208 and the information terminal 2 enters the photographing mode, for example. The processing of the HMD 1 is started when the wearer turns the power of the HMD 1 ON, for example. The processing in each step in FIG. 12 is implemented by the arithmetic unit 201 of the information terminal 2 and the arithmetic unit 101 of the HMD 1 executing a program that controls other composing elements indicated in FIG. 11. In the following description, the processing in each step will be described primarily focusing on the arithmetic unit 201 of the information terminal 2, the arithmetic unit 101 of the HMD 1 or other composing elements controlled by these arithmetic units.

A same processing step as that in FIG. 4 will be denoted with a same reference sign, and detailed description thereof will be omitted. The processing step in S201 of the information terminal 2 and the processing step in S101 of the HMD 1 are the same as Embodiment 1. When the photographing mode start notice is received in S101, processing advances to S1212.

In S1212, the position information acquiring unit 1119 acquires the position information of the HMD 1. In S1213, the communication unit 103 sends the position information of the HMD 1 acquired in S1212 to the information terminal 2.

When the start of the photographing mode is notified to the HMD 1 in S201, processing advances to S1202. The position information acquiring unit 1129 acquires the position information of the information terminal 2. In S1203, the image processing unit 202 acquires the photographing parameters of the imaging unit 207. In S1204, the image processing unit 202 calculates the favorable photographing range based on the acquired photographing parameters of the information terminal 2 and the position information of the information terminal 2.

Figure 13A:
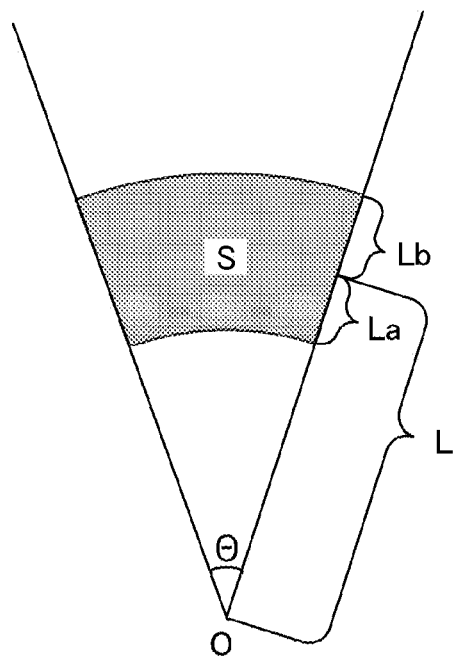
FIGS. 13A to 13C are diagrams for describing a good photographing range.

Here, the favorable photographing range and the photographing parameters will be described with reference to FIG. 13A. FIG. 13A is a conceptual diagram indicating the favorable photographing range of the imaging unit 207 of the information terminal 2. The position of the information terminal 2 is assumed to be O. The angle of the horizontal angle of view, with respect to the photographing direction of the imaging unit 207, is $\Theta$. The distance to the subject that the photographer expected is L. The forward depth of field from L is La, and the backward depth of field from L is Lb.

A region S is the favorable photographing range. In the example in FIG. 13A, the region S is a region of which the horizontal angle of view is within the angle $\Theta$, and the distance from the information terminal 2 is within a range of (L−La) to (L+Lb). The photographing parameters of the imaging unit 207 are, for example, a size of the image sensor, a focal distance a permissible diameter of the circle of confusion, and an aperture value. Using the distance of the subject that the photographer expects (hereafter called "subject distance"), the horizontal angle of view Θ, the forward depth of field La and the backward depth of field Lb are given by the following Expressions 1, 2 and 3.

Horizontal angle of view $\Theta = 2 \times \arctan(\text{horizontal image sensor size}/(2 \times \text{focal distance}))$    Expression 1

Forward depth of field $La = (\text{permissible diameter of circle of confusion} \times \text{aperture value} \times \text{subject distance}^2)/(\text{focal distance}^2 + \text{permissible diameter of circle of confusion} \times \text{aperture value} \times \text{subject distance})$    Expression 2

Backward depth of field $Lb = (\text{permissible diameter of circle of confusion} \times \text{aperture value} \times \text{subject distance}^2)/(\text{focal distance}^2 - \text{permissible diameter of circle of confusion} \times \text{aperture value} \times \text{subject distance})$    Expression 3

The image processing unit 202 may determine a three-dimensional favorable photographing range by calculating a vertical angle of view and a diagonal angle of view in the same manner as the horizontal angle of view Θ.

When the favorable photographing range is calculated using the photographing parameters in S1204, the communication unit 203 determines whether the position information of the HMD 1 was received in S1205 in FIG. 12. Processing advances to S1206 if the position information of the HMD 1 was received, or processing returns to S1202 if the position information of the HMD 1 was not received.

In S1206, it is determined whether the position of the HMD 1 is within the favorable photographing range of the information terminal 2. Processing advances to S207 if the position of the HMD 1 is within the favorable photographing range of the information terminal 2, or processing advances to S1207 if the position of the HMD 1 is not within the favorable photographing range of the information terminal 2.

In S1207, the image processing unit 202 generates moving information to instruct so that the HMD 1 enters the favorable photographing range. In S1208, the communication unit 203 sends the moving information generated in S1207 to the HMD 1.

Figure 13B:
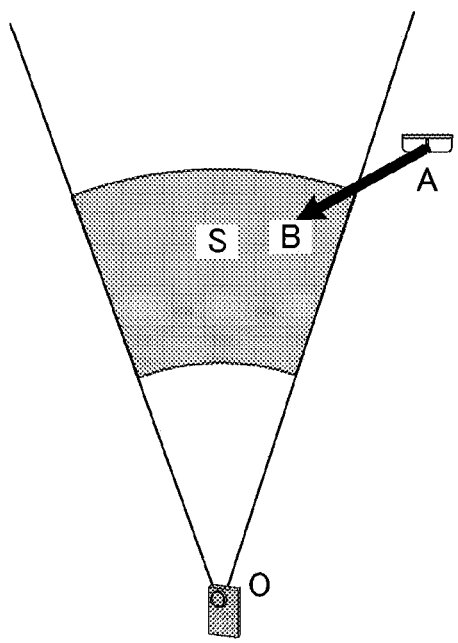

Here, the moving information will be described with reference to FIG. 13B. The favorable photographing range S, with respect to the position O of the information terminal 2, is calculated in S1204. In the example in FIG. 13B, the HMD 1 is not within the favorable photographing range, but is located at position A. The image processing unit 202 generates the moving image to guide the wearer of the HMD 1 (subject) to the favorable photographing range. The moving information may be the information on a moving destination within the favorable photographing range, for example, such as the position information on position B.

In S1214 in FIG. 12, the communication unit 103 determines whether the moving information was received from the information terminal 2. Processing advances to S1215 if the moving information was received, or processing advances to S109 if the moving information was not received.

In S1215, the arithmetic unit 101 generates an object image, which is displayed to guide the subject to the favorable photographing range, based on the moving information received in S1214. In S1216, the display unit 106 displays the object image generated in S1215. The display unit 106 may display the object image with hiding the display of the LV image, or may display the object image combined with (superimposed on) the LV image. In the case of displaying the object image combined with the LV image, the display unit 106 may adjust the display state by decreasing the brightness of the LV image, or decreasing the size of the LV image so that the object image can be more clearly seen.

Figure 13C:
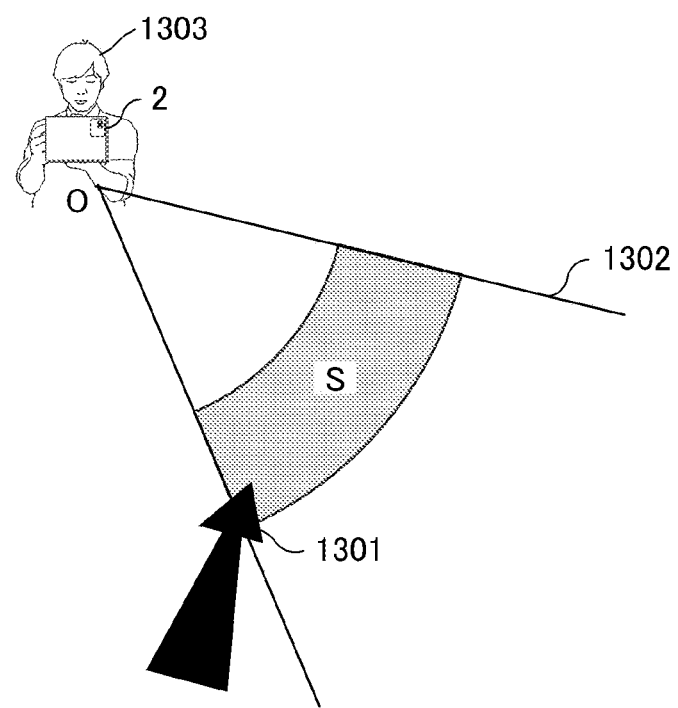

FIG. 13C is a display example of the object image generated in S1215. With respect to the position O of the information terminal 2 of the photographer 1303, the HMD 1 displays a virtual object 1301, which is an arrow-shaped object directed inward of the favorable photographing range S, and a virtual object 1302, constituted of lines and a region indicating the favorable photographing range.

The subject wearing the HMD 1 moves according to the object images displayed in S1216. Until the HMD 1 enters the favorable photographing range, the HMD 1 repeats the processing steps from S1212 to S1216, and the information terminal repeats the processing steps from S1202 to S1208. In S1206, the information terminal 2 determines whether the position of the HMD 1 is within the favorable photographing range of the information terminal 2. Processing advances to S207 if the position of the HMD 1 is within the favorable photographing range of the information terminal 2.

The above example is a case of determining the favorable photographing range considering the horizontal angle of view, but the present invention is not limited to this. The favorable photographing range may be determined considering the vertical angle of view as well. In the case of considering the vertical angle of view as well, the favorable photographing range exists stereoscopically in a three-dimensional space for photographing. In this case, the moving information generated in S1207 and the display objects generated in S1215 become the moving information and the display objects considering the three-dimensional position.

The processing steps S207 to S212 of the information terminal 2 are the same as Embodiment 1. Processing returns to S1202 if the photographing instruction for a still image was not received in S207 or if the end of the photographing mode was not instructed in S211. The processing steps S109 to S112 of the HMD 1 are the same as Embodiment 1. Processing returns to S1212 if the photographing mode end notice was not received in S112.

In Embodiment 4, the favorable photographing range of the information terminal 2 is set based on the position of the information terminal 2 and the photographing parameters of the imaging unit 207. If the HMD 1 worn by the subject is not within the favorable photographing range, the information terminal 2 generates the moving information to guide the subject to the favorable photographing range. Based on the moving information received from the information terminal 2, the HMD 1 generates the display objects to guide the subject to the favorable photographing range and displays the objects on the display unit 106. In the HMD1, by displaying the objects to guide the subject to the favorable photographing range, assistance to photograph the subject well can be provided.

Among the processing steps of the information terminal 2 in FIG. 12, the processing step to calculate the favorable photographing range, based on the photographing parameters of the imaging unit 207 (S1204), may be executed by the HMD 1. In this case, the HMD 1 can receive the imaging parameters from the information terminal 2, and calculate the favorable photographing range based on the received imaging parameters. The HMD 1 may also determine whether the HMD 1 is within the favorable photographing range, and execute the processing steps to generate the moving information (S1206, S1207). Once the imaging parameters are received from the information terminal 2, the HMD 1 can calculate the favorable photographing range, generate the moving information, and generate the objects, hence the communication load with the information terminal 2 can be decreased.

Embodiment 5

Similarly to Embodiment 4, Embodiment 5 is an embodiment for, in a case where photographing a subject wearing the HMD 1, supporting the appropriate photographing of the subject by displaying information to assist photographing, which is based on the photographing parameters of the information terminal 2, on the HMD 1. In Embodiment 4, the information terminal 2 calculates the favorable photographing range using the photographing parameters. In Embodiment 5, on the other hand, the information terminal 2 calculates the time-based favorable photographing range (hereafter "favorable photographing period") using the photographing parameters. During the favorable photographing period, the HMD 1 displays a notice that photographing is progressing. By displaying information to assist photographing on the HMD 1, based on the time-based favorable photographing period, the information terminal 2 can prevent blurring caused by the movement of the subject, or can allow the line-of-sight of the subject to focus on the imaging unit 207 in a case where the subject wearing the HMD 1 is photographed.

(Hardware Configuration of Embodiment 5): The hardware configurations of the HMD 1 and the information terminal 2 according to Embodiment 5 are the same as the hardware configurations of Embodiment 1 indicated in FIG. 3, hence description thereof will be omitted.

Figure 14:
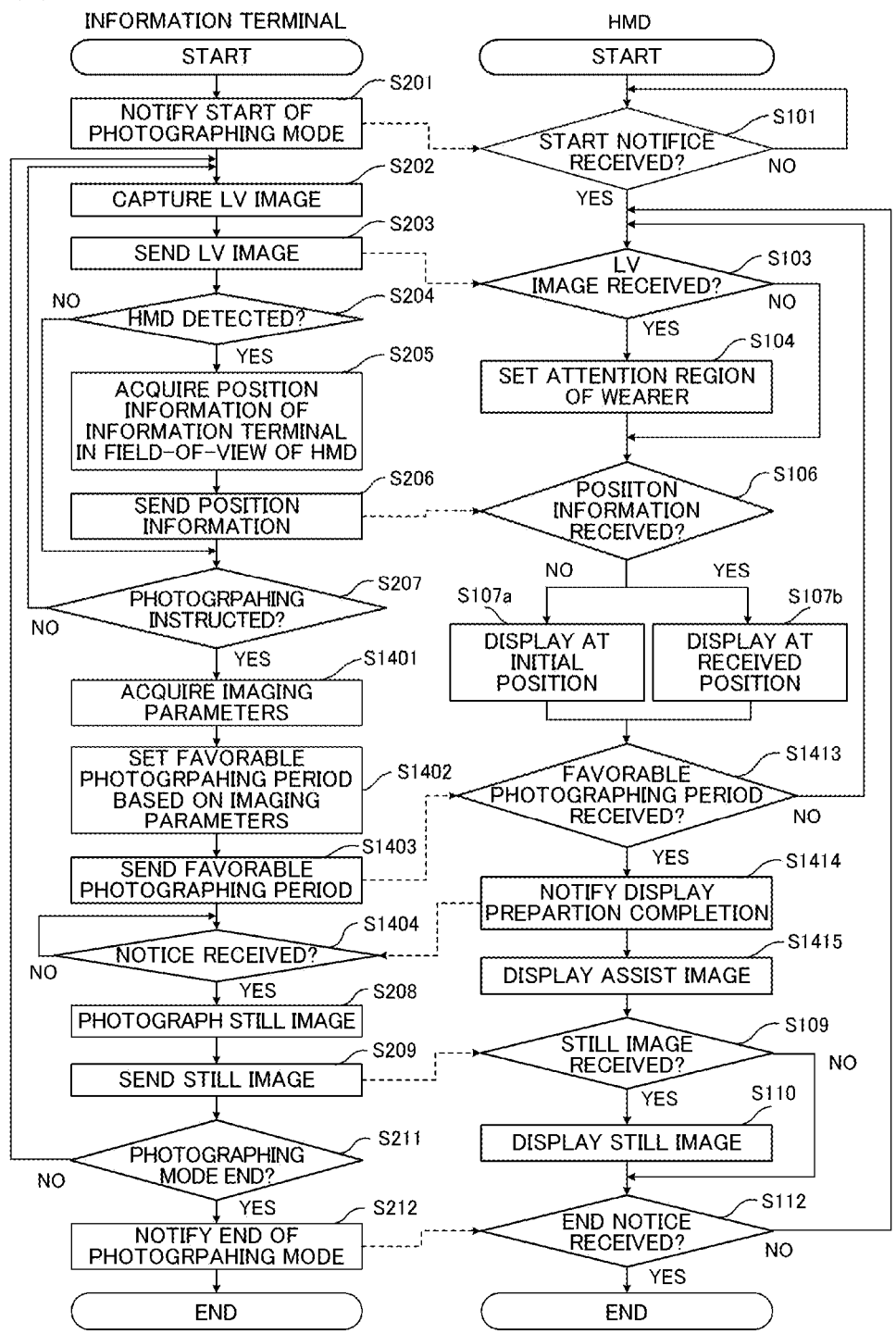
FIG. 14 is a flow chart exemplifying photographing processing steps according to Embodiment 5.

(Photographing Processing of Embodiment 5): FIG. 14 is a flow chart exemplifying the photographing processing of Embodiment 5. A processing step the same as in FIG. 4 will be denoted with a same reference sign, and detailed description thereof will be omitted. The processing steps from S100 to S107a and S107b of the HMD 1 and the processing steps from S200 to S207 of the information terminal 2 are the same as Embodiment 1.

When the photographing instruction for a still image is received in S207, processing advances to S1401. In S1401, the arithmetic unit 201 acquires the photographing parameters of the imaging unit 207. Specifically, the arithmetic unit 201 acquires information on the exposure period for the image sensor of the imaging unit 207 to expose pixel units for imaging.

In S1402, the arithmetic unit 201 sets the exposure period as the favorable photographing period. In S1403, the communication unit 203 sends the favorable photographing period, which is set in S1402, to the HMD 1.

In S1413, the communication unit 103 determines whether the favorable photographing period was received from the information terminal 2. Processing advances to S1414 if the favorable photographing period was received, or processing returns to S103 if the favorable photographing period was not received. In S1414, the arithmetic unit 101 acquires an assist image to be displayed on the display unit 106. The assist image may be stored in the secondary storage unit 105 in advance. When the display unit 106 completes preparation to display the assist image, the communication unit 103 sends the assist image display preparation completion notice to the information terminal 2.

In S1404, it is determined whether the assist image display preparation completion notice was received. If the assist image display preparation completion notice was received, processing advances to S208. If the assist image display preparation completion notice was not received, on the other hand, the processing in S1404 is repeated until the assist image display preparation completion notice is received.

In S208, the imaging unit 207 starts photographing the still image, and in S1415, the display unit 106 displays the assist image prepared in S1414 during the favorable photographing period. The assist image includes the information to notify the wearer of the HMD 1 that the information terminal 2 is photographing.

Figure 15:
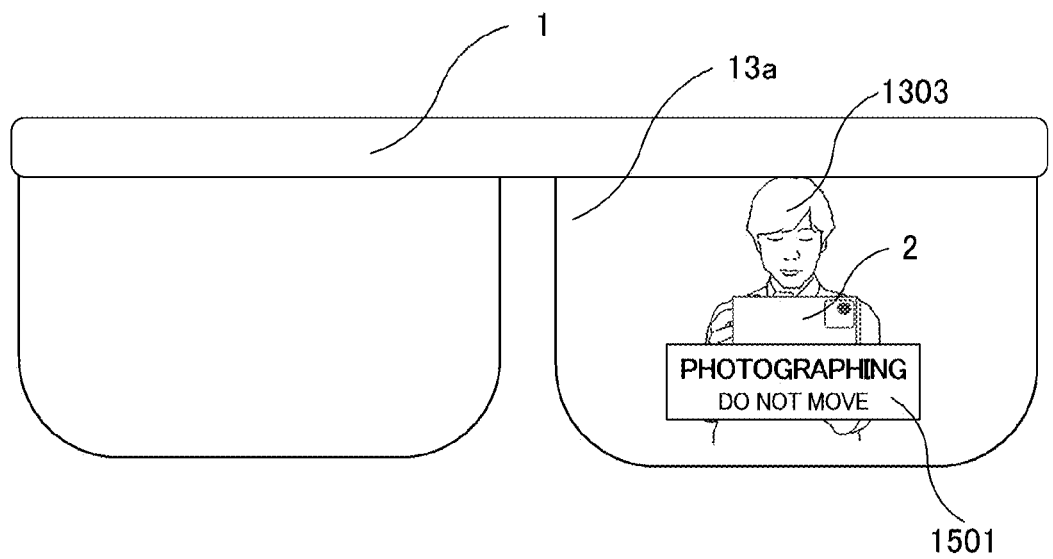
FIG. 15 is a diagram indicating a display example of an HMD.

FIG. 15 is an example of the assist display, which is displayed on the display unit 106 of the HMD 1 in S1415. In the case of FIG. 15, the display unit of the HMD 1 displays the assist image 1401, which indicates that the information terminal 2 is photographing, so as to overlap with the photographer 1303 and the information terminal 2.

The processing step in S208 to S212 of the information terminal 2 are the same as Embodiment 1. The processing steps in S109 to S112 of the HMD 1 are the same as Embodiment 1.

In Embodiment 5, the favorable photographing period of the information terminal 2 is set based on the photographing parameters of the imaging unit 207 of the information terminal 2. Based on the favorable photographing period received from the information terminal 2, the HMD 1 displays the display object, to notify the photographing period to the subject, on the display unit 106. By displaying the assist information during photographing, the HMD 1 can prevent blurring that is generated by the motion of the subject. Further, in the case of photographing using a plurality of imaging units 207, the HMD 1 can display the assist image overlapping with the imaging unit 207 which is currently photographing, so that the line-of-sight of the subject can focus on the imaging unit 207 which is currently photographing.

Among the processing steps of the information terminal 2 in FIG. 14, the processing steps, to detect the HMD 1 in the LV image and acquire the position information of the information terminal 2 within the field-of-view of the HMD 1 (S204, S205), may be executed by the HMD 1. Further, the processing step to set the favorable photographing period based on the imaging parameters of the imaging unit 207 (S1402) may be executed by the HMD 1. In this case, the HMD 1 can receive the imaging parameters from the information terminal 2, and set the favorable photographing period based on the received imaging parameters. If a part of the processing steps performed by the information terminal 2 is executed by the HMD 1 in this way, the processing load of the information terminal 2 can be decreased in a case where a plurality of wearers of the HMD 1 are photographed by the information terminal 2.

Other Embodiments

Each of the above embodiments was described using an example where one information terminal 2 and one HMD 1 are used, but the present invention is also applicable to the case where a plurality of information terminals 2 and HMDs 1 are used. In the case where a plurality of information terminals 2 are used, the display unit 106 of the HMD 1 may display the LV image of the information terminal 2 from which the photographing mode start notice was received, and hide the display of the LV images of the other information terminals 2. Then the information terminal 2 can photograph the line-of-sight of the subject of the HMD 1 appropriately, since the subject can direct their line-of-sight to the information terminal 2 in the photographing mode.

In the case where a plurality of information terminals 2 are used, the display unit 106 of the HMD 1 may control the display state of the LV image of the information terminal 2, from which the photographing mode start notice was received, by increasing the brightness, adding color, or increasing the size, compared with the LV images of the other information terminals 2.

Furthermore, in the case of directing the line-of-sight of the subject to a position other than the information terminal 2, the information terminal 2 may send the coordinates of the target position, to which the line-of-sight of the subject should be directed, to the HMD 1. By specifying the coordinates of a position to which the line-of-sight of the subject should be directed, the information terminal 2 can arbitrarily set a position to which the line-of-sight of the subject should be directed.

According to the present disclosure, a subject wearing an HMD can be photographed appropriately.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-010945, filed on Jan. 27, 2021, which is hereby incorporated by reference herein in its entirety.

What is claimed is:

1. An imaging system including a terminal device that includes an imaging sensor, and a head mounted display device that receives an image captured by the imaging sensor from the terminal device and displays the captured image, the imaging system comprising at least one memory and at least one processor which function as:
    a detecting unit configured to detect the head mounted display device from the captured image that is an image of a wearer of the head mounted display device; and
    a display control unit configured to control display of the captured image on the head mounted display device based on a detection result of the head mounted display device using the detecting unit,
    wherein, in a case where the detecting unit has detected the head mounted display device from the captured image, the display control unit is configured to control the display of the captured image such that the captured image including the head mounted display device overlaps with the terminal device, which is visually recognizable by the wearer through the head mounted display device, within a field-of-view of the head mounted display device.

2. The imaging system according to claim 1, wherein the display control unit is configured to control the display of the captured image such that a display format of the captured image on the head mounted display device is different between a case where the detecting unit has detected the head mounted display device from the captured image and a case where the detecting unit has not detected the head mounted display device from the captured image.

3. The imaging system according to claim 1, wherein the detecting unit is configured to acquire position information of the terminal device within a field-of-view of the head mounted display device based on the detection result, and
    wherein the display control unit is configured to control the display of the captured image, based on the position information.

4. The imaging system according to claim 3, wherein the terminal device includes at least one processor and/or at least one circuit which function as:
    the detecting unit, and
    a transmitting control unit configured to control transmitting of the position information acquired by the detecting unit to the head mounted display device.

5. The imaging system according to claim 3, wherein the head mounted display device includes at least one processor and/or at least one circuit which function as the detecting unit.

6. The imaging system according to claim 1, wherein the detection result includes at least any one of a position, a size, and an inclination of the head mounted display device in the captured image.

7. The imaging system according to claim 1, wherein the detecting unit is configured to detect any one of a subject, a region of a face of the subject, a focused region, and a center region of the captured image, from the captured image, and
    wherein the display control unit is configured to control the display of the captured image such that the subject and/or region detected by the detecting unit overlaps with the terminal device.

8. The imaging system according to claim 1, wherein the display control unit is configured to display at least any one of the captured image, a subject of the captured image, a region of a face of the subject, a focused region, or a trimmed image of a center region of the captured image.

9. The imaging system according to claim 1, wherein the display control unit is configured to control the display of the captured image based on an attention region of a wearer of the head mounted display device.

10. A method for controlling an imaging system including a terminal device that includes an imaging sensor, and a head mounted display device that receives an image captured by the imaging sensor from the terminal device and displays the captured image, the method comprising:

a detecting step of detecting the head mounted display device from the captured image that is an image of a wearer of the head mounted display device; and a display control step of controlling display of the captured image on the head mounted display device based on a detection result of the head mounted display device in the detecting step, wherein, in a case where the head mounted display device has been detected from the captured image in the detecting step, the display of the captured image is controlled such that the captured image including the head mounted display device overlaps with the terminal device, which is visually recognizable by the wearer through the head mounted display device, within a field-of-view of the head mounted display device.

11. A non-transitory computer readable medium that stores a program for use with an imaging system including a terminal device that includes an imaging sensor, and a head mounted display device that receives an image captured by the imaging sensor from the terminal device and displays the captured image, and the program causes the imaging system to execute:

a detecting step of detecting the head mounted display device from the captured image that is an image of a wearer of the head mounted display device; and a display control step of controlling display of the captured image on the head mounted display device based on a detection result of the head mounted display device in the detecting step, wherein, in a case where the head mounted display device has been detected from the captured image in the detecting step, the display of the captured image is controlled such that the captured image including the head mounted display device overlaps with the terminal device, which is visually recognizable by the wearer through the head mounted display device, within a field-of-view of the head mounted display device.

12. A head mounted display device comprising at least one memory and at least one processor which function as:

a receiving unit configured to receive, from a terminal device that includes an imaging sensor, an image captured by the imaging sensor;

an acquiring unit configured to acquire position information of the terminal device; and a display control unit configured to control the display of the captured image, which is an image of a wearer of the head mounted display device, based on the position information;

wherein, in a case where the captured image includes the head mounted display device, the display control unit is configured to control the display of the captured image such that the captured image including the head mounted display device overlaps with the terminal device, which is visually recognizable by the wearer through the head mounted display device, within a field-of-view of the head mounted display device.

* * * * *